Sept. 18, 1962 P. ERISMANN 3,054,511
FRAMES COMPRISING COLUMNS AND VERTICALLY ADJUSTABLE SUPPORTS
Filed April 11, 1960 2 Sheets-Sheet 1
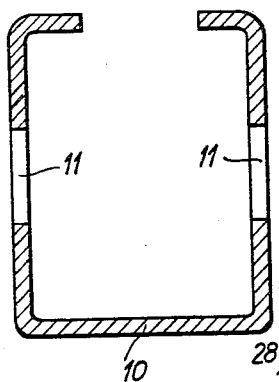
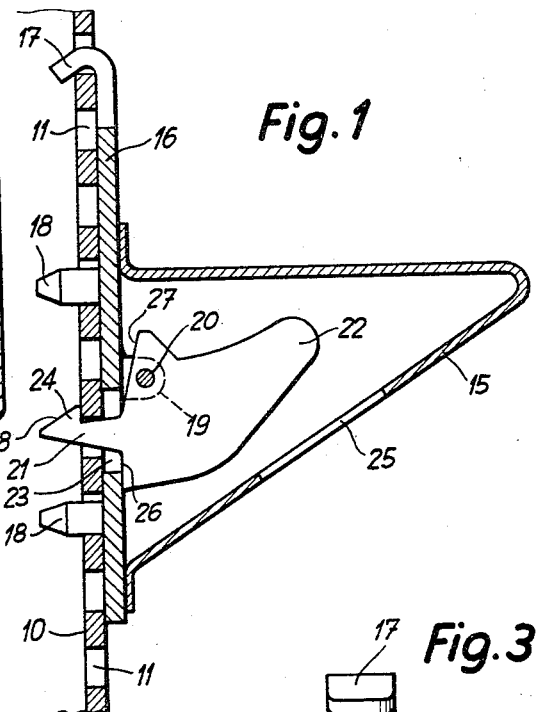
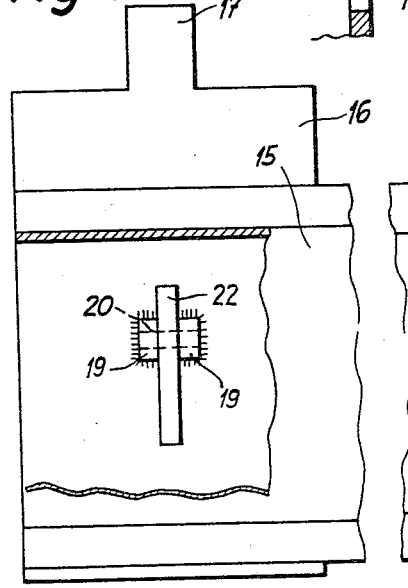
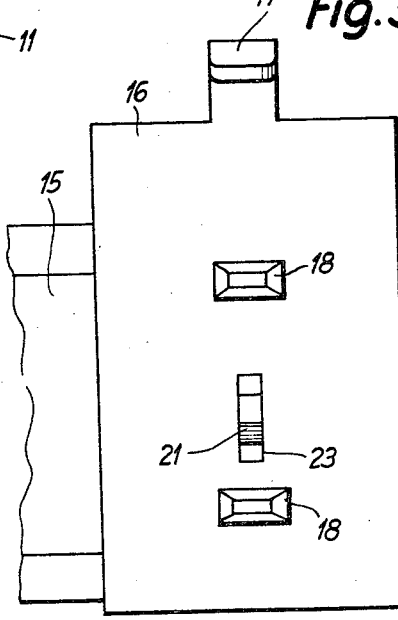
INVENTOR
PAUL ERISMANN

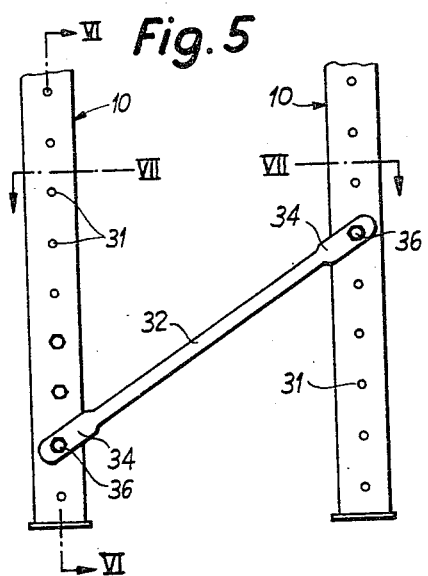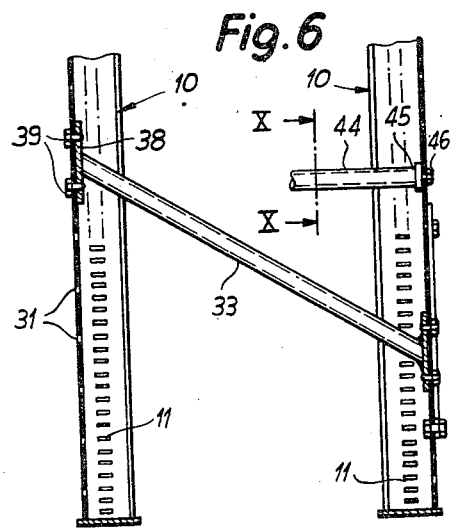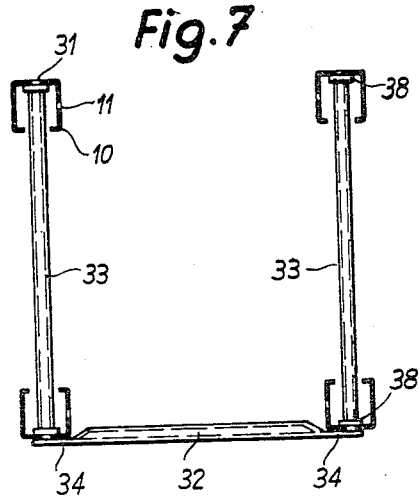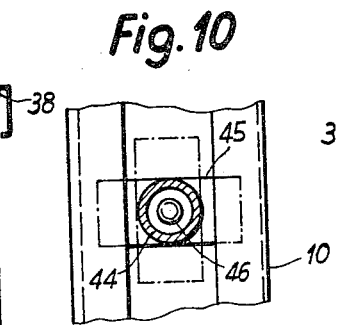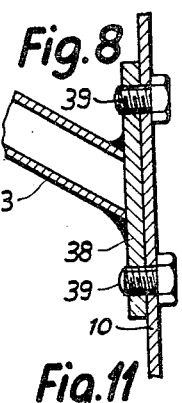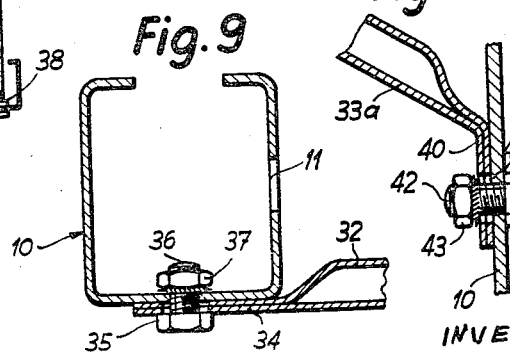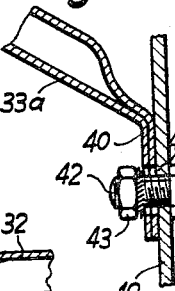

3,054,511
FRAMES COMPRISING COLUMNS AND VERTICALLY ADJUSTABLE SUPPORTS
Paul Erismann, Alpenquai 2–4, Lucerne, Switzerland
Filed Apr. 11, 1960, Ser. No. 21,378
Claims priority, application Switzerland Apr. 10, 1959
5 Claims. (Cl. 211—147)

The present invention relates to frames comprising columns each of which has at least one row of apertures spaced one above the other, and vertically adjustable supports, which have means releasably engaging in the apertures of the columns.

According to this invention each of the supports has at least one rigid hook adapted to engage in one of the apertures of the appropriate column, and at least one movable latch adapted to pass through an aperture of the column and having a tooth to engage behind a margin of this aperture to prevent the support being unintentionally released from the column, the tooth however being disengageable by an adjustment of the latch, to enable the support to be disengaged from the column.

Further objects of the invention may be seen from the claims and the following specification in which several embodiments of the invention will now be described by way of example only, with reference to the accompanying drawings.

FIGURE 1 shows in vertical section a part of a column of the frame and a support mounted thereon, FIGURE 2 is a horizontal section through the column, FIGURE 3 shows one end of the support as viewed from the left in FIGURE 1, FIGURE 4 shows the support as viewed from the opposite direction with the support partly cut away, FIGURE 5 shows a part of the frame as viewed from behind and on a smaller scale, FIGURE 6 is a vertical section along the line VI—VI in FIGURE 5, FIGURE 7 is a horizontal section along the line VII—VII in FIGURE 5, FIGURE 8 is a detail of part of FIGURE 6 on a larger scale, FIGURE 9 shows a detail of part of FIGURE 7 on a larger scale, FIGURE 10 shows a section along the line $x$—$x$ in FIGURE 6, on a larger scale, and FIGURE 11 shows a modification of the part of the frame shown in FIGURE 8.

A frame has two or more pairs of columns 10, of which only one is shown in FIGURES 1 and 2 for the sake of simplicity. Preferably all these columns 10 are identical, and formed from metal sections, which as shown in FIGURES 2, 7 and 9, are substantially of channel section. The web of the channel joining the two flanges together is at right angles to the flanges, which are parallel to one another. The free ends of the flanges of the channel are bent over to give greater mechanical strength to the columns 10. This is not absolutely necessary, however.

As shown in FIGURE 3 the two opposite channel flanges of each column 10 each have a vertical row of rectangular slots 11 spaced apart one above the other, which render possible the releasable mounting of supports, which are described below, at the desired heights.

If the frame has only two pairs of columns 10, as shown in FIGURES 5 to 7 it is sufficient if only one of the channel flanges of each column 10 is provided with the row of slots 11 spaced apart one above the other.

Each support has a horizontally extending cross-piece 15, consisting of a metal section of triangular or other suitable cross-section. Two plates 16 lying in the same plane are rigidly connected one to each end of the crosspiece 15, for example by welding. In FIGURES 1, 3 and 4 only one of these plates 16 is shown, extending vertically and applied laterally against the adjacent columns 10, as shown in FIGURE 1. At the top of each plate 16 there is a rigid hook 17, which engages a slot 11 of the associated column 10 and is bent downwards. Lower down, two prism-shaped lugs 18 are fixed to the plate 16, which lugs each engage in other of the slots 11 of the column 10. The lugs 18 have the duty of assisting the hook 17 in supporting the plate 16, with the parts fixed thereto, against the column 10.

Two bearing eyes 19 are fixed to the side of the plate 16 remote from the lugs 18, between which bearing eyes a two-armed latch 21, 22 is supported by means of a horizontal spindle 20 parallel to the plate 16 so as to be free to swing. One arm 21 of this latch passes through a slot 23 of the plate 16 and has an upwardly projecting tooth 24 which is designed to grip behind the upper margin of the associated slot 11 to secure the support against unintentional release from the column 10. The other arm 22 of the lever 21, 22 is so formed that it causes the arm 21 to swing upwards under the action of gravity, in order automatically to secure the support against the column 10. The lever arm 22 simultaneously acts as a handle, by which the locking bar 21 can be swung into an inoperative position, if it is desired to release the support from the column 10. In order to make access to the lever arm 22 possible, the crosspiece 15, within which the lever arm 22 is located, has an opening 25, through which the arm 22 can be actuated by at least one finger.

Two arrestment shoulders 26 and 27 are formed on the latch 21, 22 to restrict the freedom of the latch to swing. The shoulder 26 is of particular importance, it being so formed that, when the support is separated from the column 10, it holds the latch 21 in a ready position, from which it can easily be moved into one of the slots 11 of the column 10, the hook 17 being engaged beforehand in another of the slots 11. In order to obtain an automatic positive withdrawal of the tooth 24 during the insertion of the latch 21 into the appropriate slot 11, it is provided with an oblique surface 28.

As already stated, at each end part of the crosspiece 15 there is a plate 16. Each of these plates 16 has a hook 17 a latch 21, 22 and lugs 18 as described above, the support being mounted in this way on two columns 10.

The frame has of course at least one pair of supports, the two supports forming a pair being mounted at the same height on two pairs of columns 10. On each pair of supports, mounted at the same height, here may be laid, for example, a shelf, a loading pallet or a container.

If it is desired to adjust the height of a support, the crosspiece 15 is held at both ends, at least one finger of each hand acting through the opening 25 on one lever arm 22, and pressing it upward. This disengages the tooth 24 of the two latches 21 from the columns 10, after which the support can be swung away from the columns round the two hooks 17. This takes the lugs 18 and the latches 21 out of engagement with the columns 10. Finally the hooks 17 can be lifted out of the associated slots 11 of the columns.

In placing the support at the new height first or all the two hooks 17 are suspended in slots 11 located at the same height, and the plates 16 swung against the columns 10 into the vertical position. This automatically brings the lugs 18 and the latches 21 into slots 11 of the columns. By means of the oblique surfaces 28 the latches are rocked at each end of the support against the influence of gravity. As soon as the plates 16 lie flat against the columns 10, the teeth 24 engage behind the upper edge of the associated slots 11, thus preventing the support from being inadvertently released from the columns 10. The load of the support and the objects (not shown) arranged on it, is transmitted by means of the lugs 18 to the columns 10. The hooks 17 only serve to facilitate finding the correct position for the plates 16. It is also possible however to use the hooks 17 also for transmitting the load.

The support fitted to the columns cannot be released from them inadvertently by vibration, shocks or blows, thus effectively avoiding undesirable or even dangerous accidents.

If the columns 10 of the frame are not fixed at top and bottom, e.g. embedded in concrete, it is necessary to connect the columns together by cross-stays. The screws for fixing the cross-stays can be inserted through the recesses 11 of the columns 10. This however involves the disadvantage that the supports can no longer be applied at any height desired. To avoid this defect the columns 10 are provided with an additional row of holes 31 spaced apart one above the other in the webs of their channels, which holes serve to receive bolts for fixing the cross-stays (FIGURES 5 and 6).

Three cross-stays 32, 33 and 44 are shown in FIGURES 5 to 10. The obliquely extending cross-stays 32 are applied to the rear side of the frame, only one of which cross-stays is shown in FIGURE 5, and are each formed from a tubular component, the two end parts 34 of which are flattened and have a long hole 35, as is shown in FIGURE 9. Through each hole 35 and one of the holes 31 of the associated column 10 a bolt 36 is inserted which has a nut 37 on the inner side of the web of the channel of the column 10. For the sake of clearness the bolts 36 are not shown in FIGURE 7.

The cross-stays 33 are arranged laterally to the frame, also extending obliquely, and their end parts enter between the channel flanges of two columns 10 of a pair, as is clearly shown in FIGURES 6 and 7.

The cross-stays 33 are also formed from tubular components. A plate 38 is welded on at each end of each cross-stay 33, which plate lies flat against the inside of the associated channel web of the column 10 and has two threaded bores, in which fixing screws 39 engage; these are inserted through two successive holes 31 of the appropriate column, as is shown in FIGURE 8. For the sake of clearness the screws 39 are not shown in FIGURE 7.

In FIGURES 6 and 10 further cross-stays 44 are shown, which are arranged laterally to the frame and horizontally, with their ends likewise entered between the two channel flanges of the appropriate columns 10. In FIGURE 6 for the sake of simplicity one of these cross-stays 44 is only partly shown. The cross-stays 44 are again formed from a tubular component, to whose end plates 45 are welded. In each plate 45 there is a threaded bore, co-axial with the tubular component of the cross-stay 44, for receiving a fixing screw 46, which is inserted through one of the holes 31 of the appropriate column 10. The plates 45 are rectangular and are inserted as shown in dotted line in FIGURE 10 in the vertical position between the channel flanges of the columns 10 and then rotated 90° into the horizontal position. After this the fixing screws 46 are inserted and screwed up tight.

Instead of the cross-stays 33 more simply formed cross-stays 33a (FIGURE 11) may be used. These are formed from tubular components, whose two end parts 40 are flattened and bent away from the longitudinal direction of the stay. The end parts 40 each have a slot 41 and lie flat against the inside of the appropriate channel webs of the columns 10. Fixing bolts 42 are inserted through holes 31 in the columns and through the holes 41 of the end parts and each carry a nut 43.

The said cross-stays 32, 33, 33a and 44 do not in any way prevent the mounting of the supports and give a high stability to the frame.

The columns 10 may be of any section desired. However, so that the cross-stays shall not prevent the mounting of the supports, the holes 31 are provided for fixing the cross-stays in another side of the column to that in which the slots 11 are provided.

What I claim is:

1. A frame comprising spaced columns, each of said columns having a row of spaced consecutive apertures therein, supports to be adjustably mounted on said columns, a rigid hook on each of said supports to engage in one of the apertures of a column, a movable latch pivotally mounted on said supports adapted to pass through another of the apertures of the column, a tooth on said latch to engage behind one margin of said last named aperture to prevent the support from being inadvertently released from the column, said tooth being disengageable by an adjustment of said latch to enable the support to be disengaged from the column, said latch under the influence of gravity engaging said tooth behind a margin of said last named aperture and said tooth having an oblique surface which forces back said tooth so that in mounting the support on the column said tooth may enter said aperture to lock said support to said column, each of said supports comprising a horizontally extending crosspiece having a cavity therein and an opening which connects one pair of said columns, and having at each end part at least one rigid hook and one movable latch, said hooks and latches engaging in various of the slots of said columns, each of said latches having a lever arranged in said cavity of the crosspiece, said lever being accessible through said opening in the crosspiece in order to provide disengagement of the tooth of the latch when the crosspiece is removed or shifted to an altitude level.

2. A frame as set forth in claim 1 wherein stops are provided on said latch, which restrict the freedom of the latch to rock, one of said stops being so formed that, when the support is released from the column the latch is in a ready position, from which it automatically enters the corresponding aperture when the support is applied to the column.

3. A frame as set forth in claim 1 wherein said hook is provided at the top of a vertically extending plate secured to the support and is bent back downwardly, and said latch is pivotally mounted on the bottom of said plate with said tooth projecting upwardly.

4. A frame as set forth in claim 1 wherein when said latches are disengaged and the hooks are hooked to said columns, said crosspiece with its lower edge is swingable from said columns until said latches are wholly disengaged from said columns, said tooth of said latches having an inclined sliding surface that at a reverse swinging movement of said crosspiece against said columns, said latches automatically each engage with one of said slots of said columns.

5. A frame as set forth in claim 1 wherein each of the end parts of said crosspiece comprises at least one rigid plate which horizontally engages in another slot of the pertinent column that said hook and said latch, said plate transferring the load of said crosspiece to the columns for the release of the hooks.

References Cited in the file of this patent

UNITED STATES PATENTS

| | | |
|---|---|---|
| 1,073,595 | Dight | Sept. 23, 1913 |
| 1,280,114 | Williams et al. | Sept. 24, 1918 |
| 1,862,056 | Kelly | June 7, 1932 |
| 2,113,959 | Campbell | Apr. 12, 1938 |
| 2,127,280 | Zimbalist | Aug. 16, 1938 |
| 2,875,904 | Gingher | Mar. 3, 1959 |
| 2,925,181 | Saul | Feb. 16, 1960 |